United States Patent [19]
Moore et al.

[11] 3,870,639
[45] Mar. 11, 1975

[54] FILTERING DEVICE

[75] Inventors: Francis C. Moore; Leon R. Perkinson, both of Indianpolis, Ind.

[73] Assignee: Moore-Perk Corporation, Indianapolis, Ind.

[22] Filed: Jan. 2, 1974

[21] Appl. No.: 429,594

[52] U.S. Cl. ............. 210/359, 23/259, 210/DIG. 23
[51] Int. Cl. ............................................. B01d 33/00
[58] Field of Search .......... 23/259, 258.5; 210/359, 210/DIG. 23; 128/220, 2 F

[56] References Cited
UNITED STATES PATENTS

| | | | |
|---|---|---|---|
| 1,386,340 | 8/1921 | Wuster | 210/359 |
| 3,481,477 | 12/1969 | Farr | 23/258.5 X |
| 3,493,503 | 2/1970 | Mass | 210/DIG. 23 |
| 3,512,940 | 5/1970 | Shapiro | 210/DIG. 23 |
| 3,661,265 | 5/1972 | Greenspan | 210/DIG. 23 |
| 3,682,174 | 8/1972 | Cohen | 128/220 |

*Primary Examiner*—Morris O. Wolk
*Assistant Examiner*—Sidney Marantz
*Attorney, Agent, or Firm*—Dawson, Tilton, Fallon and Lungmus

[57] ABSTRACT

A device for filtering liquids such as blood and other body fluids to separate the fluid and particulate components thereof and to confine the particulate content. An open-ended inner tube is provided at its lower end with an integral flexible lip which slidably and sealingly engages the inside surface of an outer tube containing the liquid to be filtered. Within the inner tube's lower end is a retainer sleeve having a flow passage extending axially therethrough. A filter membrane extends over one end of the sleeve and also between opposing side walls of the sleeve and inner tube to perform the dual functions of filtering fluid flowing through the passage as the inner tube is urged into the liquid-containing outer tube, and of forming a sealing gasket for securing the sleeve and membrane in place within the inner tube. A stop shoulder limits the extent to which the sleeve and membrane may be forced axially into the inner tube.

17 Claims, 7 Drawing Figures

PATENTED MAR 11 1975 3,870,639
FIG. 1 FIG. 2 FIG. 3 FIG. 4
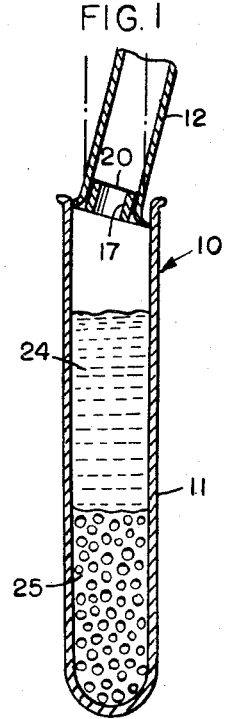
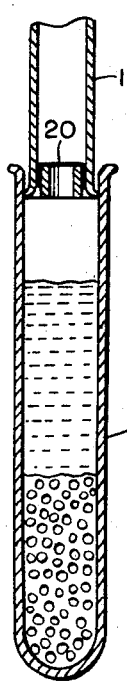
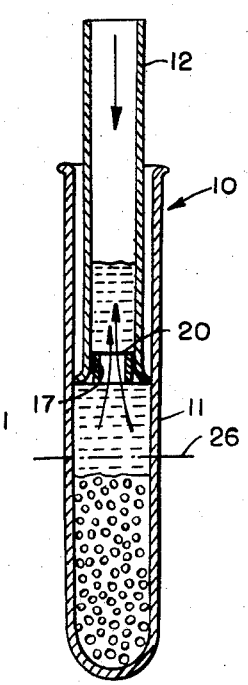
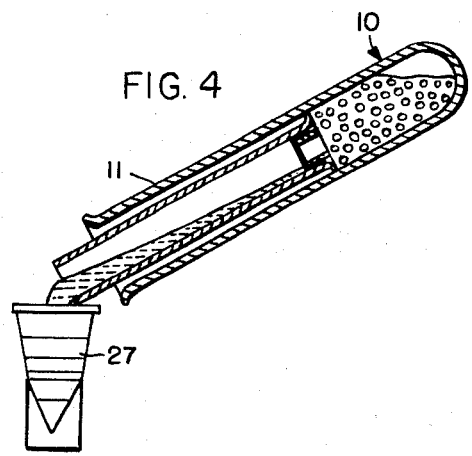
FIG. 5
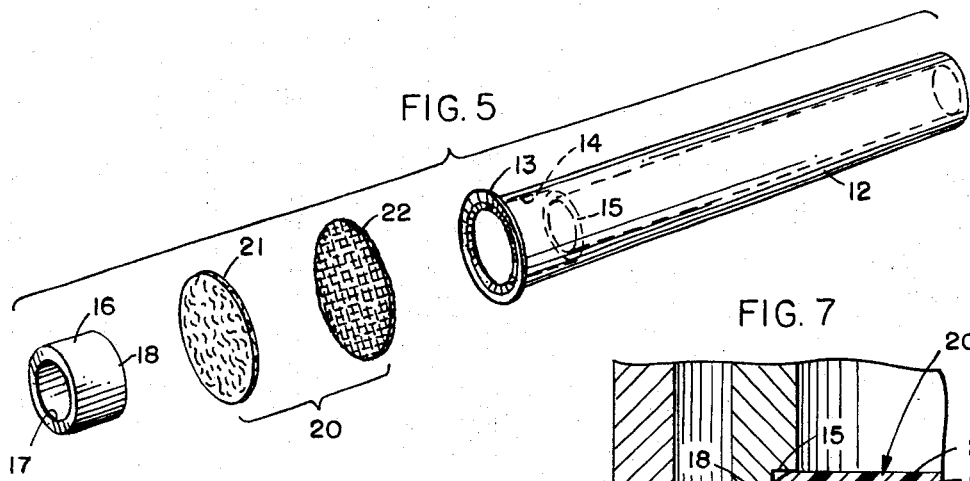
FIG. 7
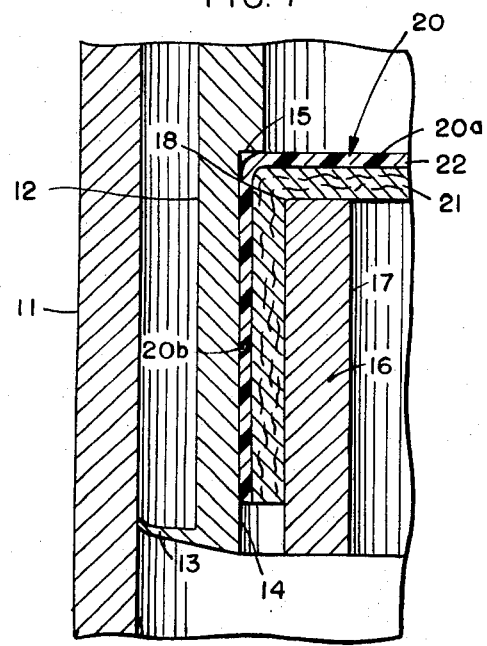
FIG. 6
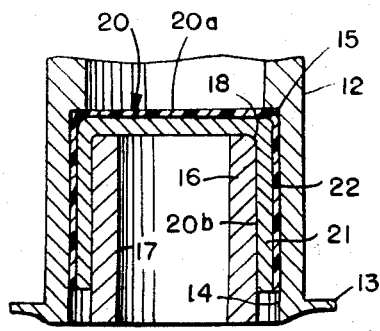

FILTERING DEVICE

BACKGROUND

Filtering devices for separating the liquid and particulate components of body fluids are well known in the art, as represented by U.S. Pat. Nos. 3,661,265, 3,693,804, 3,355,098, and 3,512,940. Preferably the filter element used in such devices should be of relatively large transverse dimensions so that the stream of fluid exposed to the filter will be of large cross sectional area. A large cross sectional area increases the speed and efficiency of the filtering operation and reduces the possibility that the filter will become clogged with particulate matter. In the past, it has been considered necessary, if a filter with large area is to be utilized, to form such filter of relatively rigid material so that it may be securely mounted within the inner tube. Stated differently, a construction which provides increased cross sectional area for a filter mounted within a tube of fixed internal dimensions also tends to provide reduced area for attachment of the filter and, since substantial forces are applied during a filtering operation, it has been considered necessary to form such filters of relatively rigid materials in order to facilitate such attachment and to prevent the filters from becoming dislodged in use. Rigid filters formed of plastic, metal, or sintered glass U.S. Pat. No. (3,512,940) are relatively expensive, a definite shortcoming in a product intended to be discarded after a single use.

Other references illustrating the state of the art are U.S. Pats. Nos. 1,386,340, 2,571,059, 3,488,768, and 3,448,041.

SUMMARY

A main object of this invention is to provide an improved disposable filtering device which overcomes the aforementioned defects and disadvantages of prior constructions. Specifically, it is an object to provide a filtering device which not only incorporates a filter having relatively large transverse dimensions but which also utilizes conventional non-rigid filtering materials. Such thin planar materials, such as standard microporous filter sheets, will be referred herein as filter membranes in contrast to non-planar wadding or packing materials which have sometimes been used in the past for filtering purposes.

The device includes an outer tube, such as a conventional test tube, closed at its lower end and adapted to contain the liquid to be filtered. An open-ended inner tube is insertable into the outer tube and has a flexible lip extending about its open lower end for slidably and sealingly engaging the inside surface of the outer tube. A filter retaining sleeve with a relatively large flow passage extending axially therethrough is disposed within the lower end of the inner tube. A thin flexible membrane filter has a central portion which extends over one end of the sleeve and has a peripheral skirt portion which is tightly interfitted or wedged between the outer surface of the sleeve and the inside surface of the inner tube. The filter membrane is thus supported to filter liquid flowing through the sleeve's flow passage and, in addition, provides a tight resilient sealing gasket for securing the sleeve and membrane in place within the inner tube.

In the best mode presently known for praticing the invention, the filter membrane has inner and outer layers of material, the inner layer being formed of fibrous non-woven sheet material and the outer layer being formed of a strong non-linting porous plastic sheet. The inside surface of the inner tube is stepped to define an annular shoulder engaged by the filter membrane, and in particular, by the flexible reinforcing plastic layer of that membrane.

Other advantages and objects of the invention will become apparent as the specification proceeds.

DRAWINGS

FIGS. 1–4 are sectional longitudinal views illustrating a filter device embodying the invention and showing successive stages in the use of such a device.

FIG. 5 is an exploded perspective view illustrating the inner tube, retaining sleeve, and separated layers of the membrane filter.

FIG. 6 is an enlarged fragmentary vertical sectional view illustrating the construction at the lower end of the inner tube.

FIG. 7 is a still further enlarged fragmentary sectional view showing details of construction at the lower end of the inner tube and also showing the relationship between the sealing lip of the inner tube and the inner surface of the outer tube.

DESCRIPTION

Referring to the drawings, the numeral 10 generally designates a filtering device comprising an outer tube 11, open at its upper end and closed at its lower end, and an inner tube 12, open at both ends. In the embodiment illustrated in the drawings, outer tube 11 takes the form of a conventional blood specimen tube as used in clinical laboratories. The inner tube is cylindrical in shape and, as shown most clearly in FIGS. 3 and 7, has an outside diameter smaller than the inside diameter of the outer tube. At its lower end, however, the inner tube is provided with a flexible annular lip 13 having a diameter slightly greater than that of the interior of tube 11; hence, when the parts are telescoped together, lip 13 slidably and sealingly engages the inside surface of the outer tube (FIG. 7). Lip 13 is formed as an integral part of the inner tube which in turn is formed of any suitable non-brittle plastic material such as, for example, polypropylene, polyethylene, or the like. The outer tube may also be formed of plastic although in most instances such tube will be formed of glass. All of the structure so far described is essentially conventional and well known in the art.

From FIGS. 5–7, it will be observed that the inner tube 12 is internally enlarged at its lower end portion to define a cylindrical recess 14 terminating in an annular shoulder 15 spaced from the tube's open lower end. A filter retaining sleeve 16 of cylindrical configuration is disposed within recess 14 and, as shown in the drawings, has a relatively large flow passage 17 extending axially therethrough. The cross sectional dimensions of that flow passage may be even greater (relative to the remaining structure) than shown, the main factor being the wall thickness required to provide the sleeve with sufficient strength and structural rigidity for the purposes hereinafter described. The drawings illustrate a relative wall thickness which has been found effective if the sleeve is formed from high density polyethylene; however, if other suitable materials of even greater strength and stiffness are utilized, it is believed that the wall thickness of the sleeve may be reduced to provide a flow passage of even larger cross sectional dimensions.

The outside diameter of sleeve 16 is slightly smaller than the cross sectional dimensions of recess 14. Preferably, the upper outer edge 18 of the sleeve is rounded or beveled to avoid the possibility of cutting or damaging filter membrane 20.

The filter membrane 20 consists of one or more sheets of thin flexible microporous filter material, the size of the pores depending primarily on the liquid to be filtered and, in particular, on the size of the particles to be restrained. In the embodiment illustrated, the membrane 20 is composed of two contiguous layers 21 and 22, the inner layer 21 being formed from a sheet of conventional microporous non-woven filter paper or cloth and the outer layer 22 being formed from a sheet or film of tough porous plastic material such as, for example, spun-bonded nylon. Alternatively, the outer layer might consist of a flexible film of tough perforated plastic. In any event, the outer layer must be non-linting in character and, if necessary, should perform the functions of reinforcing the inner layer and of blocking the release of fibers of filaments from the inner layer.

The composite filter membrane 20 is circular in outline with a diameter substantially larger than the outside diameter of retainer sleeve 16. As shown most clearly in FIGS. 6 and 7, the membrane has a central portion 20a which extends over one end (the upper end) of the sleeve and has a peripheral skirt portion 20b tightly interfitted between the outer surface of the sleeve and the inside surface of cylindrical recess 14. By being wedged tightly between the sleeve and inner tube, the skirt portion thereby performs the dual functions of holding the filter membrane securely in position within the inner tube and also providing in effect a sealing gasket for securing or frictionally holding the sleeve within the recess. Shoulder 15 serves as a stop to limit the extent of upward movement of the sleeve and membrane within tube 12. While the opposing side wall surfaces of the sleeve 16 and tube 12 are spaced apart, the fact that such annular spacing is occupied by the skirt portion 20b of the membrane in tightly compressed condition, and the further fact that shoulder 15 engages the top surface of the membrane's central portion, effectively prevent such annular spacing from becoming a non-filtering by-pass route for the flow of liquid during operation of the device.

The steps of operation when the device is used for the filtering of a sample of centrifuged blood are illustrated in FIGS. 1–4. It is assumed that the blood (or other body fluid) has already been centrifuged in specimen tube 11 to provide an upper liquid or supernatant layer 24 and a lower particulate-containing layer 25. In the case of blood, the upper layer would consist essentially of serum or plasma and the lower layer of blood cells. Inner tube 12 is preferably inserted in slightly tipped condition into the open mouth of the specimen tube, the inclination facilitating such insertion (FIG. 1). Thereafter, the inner filtering tube is adjusted to an upright position coaxial with the lower tube (FIG. 2) and is then lowered slowly through the serum layer 24 to force the liquid upwardly through the flow passage 17 of the sleeve and through the central portion of filter membrane 20 (FIG. 3). Advancement of the inner tube into the outer tube is discontinued when the lower end of the inner tube is still spaced slightly above cells 25, such level being indicated by line 26 in FIG. 3. Thereafter, the filtered plasma or serum collected in the inner tube may be decanted into a suitable receiving vessel 27 for further testing, as illustrated in FIG. 4, or may be withdrawn from the inner tube by means of a pipette or by any other suitable means. Membrane 20 and sealing lip 13 retain the particulates in the closed lower end portion of outer tube 12 during such a decanting or extracting operation.

While in the foregoing an embodiment of the invention has been disclosed in considerable detail for purposes of illustration, it will be understood by those skilled in the art that many of these details may be varied without departing from the spirit and scope of the invention.

We claim:

1. A device for filtering liquids to separate and confine the particulates contained therein, comprising an outer tube closed at the lower end thereof and adapted to contain the liquid to be filtered, an open-ended inner tube, and flexible lip means projecting outwardly at the lower end of said inner tube for slidably and sealingly engaging the inside surface of said outer tube, wherein the improvement comprises a filter retaining sleeve having an outer surface with a diameter slightly smaller than the inside diameter of said inner tube at the lower end thereof and having a relatively large flow passage extending axially therethrough, said retaining sleeve being disposed within the lower end of said inner tube, and a thin flexible membrane filter of generally circular configuration having planar dimensions substantially larger than the inside diameter of said inner tube, said filter membrane having a central portion extending over one end of said sleeve and have a peripheral skirt portion tightly interfitted between the outer surface of said sleeve and the inside surface of the inner tube at the lower end thereof, said filter membrane thereby being supported to filter liquid flowing through the flow passage of said sleeve and providing a sealing gasket for securing the sleeve and membrane in place within the inner tube.

2. The device of claim 1 in which said filter membrane is resilient and has its skirt portion compressed between said sleeve and inner tube.

3. The device of claim 2 in which said filter membrane is formed of fibrous non-woven sheet material.

4. The device of claim 2 in which said filter membrane comprises inner and outer layers, one of said layers being formed of fibrous non-woven sheet material and the other of said layers being formed of porous substantially non-linting plastic sheet material.

5. The device of claim 1 in which said central portion of said filter membrane extends over the upper end of said sleeve.

6. The device of claim 5 in which said filter membrane comprises an inner layer and an outer layer, the inner layer having its skirt portion directly engaging the outer surface of said sleeve and said outer layer directly engaging the inside surface of said inner tube, said inner layer being formed of fibrous non-woven sheet material and said outer layer being formed of porous substantially non-linting plastic sheet material.

7. A device for filtering liquids to separate and confine the particulates contained therein, comprising an outer tube closed at the lower end thereof and adapted to contain the liquid to be filtered, an open-ended inner tube, and flexible lip means projecting outwardly from the lower end of said inner tube for slidably and sealingly engaging the inside surface of said outer tube, wherein the improvement comprises said inner tube being internally enlarged at the lower end portion thereof to define a cylindrical recess terminating in an annular shoulder spaced from the inner tube's lower end, a filter retaining sleeve having an outer surface with a diameter slightly smaller than said recess and having a relatively large flow passage extending axially therethrough, said retaining sleeve being disposed within said cylindrical recess, and a thin flexible filter membrane of generally circular configuration having planar dimensions substantially larger than the inside diameter of said inner tube, said filter membrane having a central portion extending over the upper end of said sleeve and engaging said shoulder of said inner tube, said membrane also having a peripheral skirt portion extending downwardly about the outer surface of said sleeve and being tightly interfitted between the sleeve's outer surface and the surface of said cylindrical recess, said filter membrane thereby being supported to filter liquid flowing upwardly through the flow passage of said sleeve and providing a sealing gasket for securing the sleeve and membrane in place within said inner tube.

8. The device of claim 7 in which said filter membrane is resilient and has its skirt portion compressed between said sleeve and inner tube.

9. The device of claim 8 in which said filter membrane comprises a sheet of fibrous non-woven material.

10. The device of claim 9 in which said filter membrane comprises an inner layer and an outer layer, said inner layer having its skirt portion directly engaging the outer surface of said sleeve and said outer layer directly engaging the inside surface of said inner tube, said inner layer being formed of fibrous non-woven sheet material and said outer layer being formed of porous substantially non-linting plastic sheet material.

11. An open-ended filter tube adapted for insertion into a liquid-containing sample tube for the purpose of filtering said liquid and confining the particulates contained therein, said filter tube having a flexible lip extending about the open lower end thereof for slidably and sealingly engaging the inside surface of a sample tube, wherein the improvement comprises:

a filter retaining sleeve having an outer surface with a diameter slightly smaller than the inside diameter of said filter tube at the lower end thereof and having a relatively large flow passage extending axially therethrough, said retaining sleeve being disposed within the lower end portion of said inner tube, and a thin flexible filter membrane having planar dimensions substantially larger than the inside diameter of said filter tube, said filter membrane having a central portion extending across one end of said sleeve and having a peripheral skirt portion tightly interfitted between the outer surface of said sleeve and the inside surface of said filter tube at the lower end portion thereof, said filter membrane thereby being supported to filter liquid flowing through the flow passage of said sleeve and providing sealing means for frictionally securing the sleeve and membrane in place within said filter tube.

12. The filter tube of claim 11 in which said membrane is resilient and has its skirt portion compressed between said sleeve and the inner surface of said tube.

13. The filter tube of claim 12 in which said membrane comprises a sheet of fibrous non-woven filter material.

14. The filter tube of claim 12 in which said membrane comprises inner and outer layers, one of said layers being formed of fibrous non-woven sheet material and the other of said layers being formed of porous substantially non-linting plastic sheet material.

15. The filter tube of claim 11 in which said filter membrane extends over the upper end of said sleeve.

16. The filter tube of claim 15 in which the lower end of said tube is internally enlarged to define a cylindrical recess terminating in an annular shoulder spaced from the tube's lower end, said central portion of said filter membrane engaging said annular shoulder.

17. The filter tube of claim 15 in which said membrane comprises inner and outer layers, said inner layer having its skirt portion directly engaging the outer surface of said sleeve and said outer layer directly engaging the inside surface of said tube, said inner layer being formed of fibrous non-woven sheet material and said outer layer being formed of porous substantially non-linting plastic sheet material.

* * * * *